United States Patent
Kang (10) Patent No.: US 12,243,427 B2
(45) Date of Patent: Mar. 4, 2025

(54) METHOD AND APPARATUS FOR CONTROLLING REAR COLLISION WARNING OF VEHICLE

(71) Applicant: HYUNDAI MOBIS CO., LTD., Seoul (KR)

(72) Inventor: Eun Seok Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 317 days.

(21) Appl. No.: 18/070,343

(22) Filed: Nov. 28, 2022

(65) Prior Publication Data
US 2023/0377463 A1 Nov. 23, 2023

(30) Foreign Application Priority Data

May 20, 2022 (KR) .................... 10-2022-0061854
May 20, 2022 (KR) .................... 10-2022-0061894
May 20, 2022 (KR) .................... 10-2022-0061922

(51) Int. Cl.
 G08G 1/16    (2006.01)
 G01S 13/931  (2020.01)

(52) U.S. Cl.
 CPC ........... *G08G 1/166* (2013.01); *G01S 13/931* (2013.01); *G01S 2013/93272* (2020.01)

(58) Field of Classification Search
 CPC ......... G08G 1/166; G08G 1/168; G08G 1/16; G01S 2013/93272; G01S 13/931; G01S 13/72; B60W 50/14
 See application file for complete search history.

(56) References Cited

U.S. PATENT DOCUMENTS

| | | | |
|---|---|---|---|
| 6,674,394 B1 * | 1/2004 | Zoratti | B60T 7/16 340/436 |
| 2008/0106459 A1 * | 5/2008 | Jordan | G01S 7/411 342/70 |
| 2016/0023598 A1 | 1/2016 | Kohler et al. | |
| 2016/0252610 A1 * | 9/2016 | Smith | G01S 7/411 342/27 |
| 2017/0242443 A1 * | 8/2017 | Schuh | G08G 1/163 |
| 2019/0019412 A1 * | 1/2019 | Roca | G08G 1/168 |
| 2020/0111369 A1 * | 4/2020 | Cho | G01S 15/66 |

OTHER PUBLICATIONS

Extended European search report issued on Sep. 12, 2023, in counterpart European Patent Application No. 22209861.8 (12 pages).

* cited by examiner

*Primary Examiner* — Sisay Yacob
(74) *Attorney, Agent, or Firm* — NSIP Law (57) ABSTRACT

Disclosed is a collision warning control apparatus that obtains position and speed information of a reference point for a target vehicle at a first time point, determines a position of the reference point at a second time point based on the position and speed information of the reference point for the target vehicle at the first time point, calculates a first overall length of the target vehicle based on the position of the reference point at the second time point, determines a position of the reference point at a third time point, and calculates a second overall length of the target vehicle. The apparatus determines a reference position of the target vehicle at the third time point based on a difference between the first overall length and the second overall length, and controls collision warning for the target vehicle based on the reference position of the target vehicle.

20 Claims, 7 Drawing Sheets

METHOD AND APPARATUS FOR CONTROLLING REAR COLLISION WARNING OF VEHICLE

CROSS-REFERENCE TO RELATED APPLICATION

This application the benefit under 35 USC § 119(a) of Korean Patent Application Numbers 10-2022-0061854, 10-2022-0061894, and 10-2022-0061922, respectively filed on May 20, 2022, the entire disclosures of which are all incorporated herein by reference for all purposes.

BACKGROUND

1. Field

The present disclosure relates to a method and apparatus for controlling a collision warning of a rear cross traffic alert (ROTA) system.

2. Description of Related Art

The rear cross traffic alert (ROTA) system is a driver assistance system for warning a driver of a subject vehicle of a collision risk when there is another vehicle crossing the rear of the subject vehicle in a transverse direction as the vehicle is reversing. This system has been widely applied to vehicles in recent years.

The ROTA system tracks the position of a target vehicle using a tracking point created by detecting the target vehicle approaching from the left or right side behind the subject vehicle by radars respectively installed at left and right rear corners of the subject vehicle. The system accordingly controls the generation and cancellation of a collision warning according to the tracked position.

When implementing the system to track a target vehicle using a radar, a side of the target vehicle is detected while the target vehicle crosses the rear of the subject vehicle. In this case, as the target vehicle moves, the position of the tracking point is shifted from a position corresponding to the front surface portion of the target vehicle to a position corresponding to the rear surface portion of the target vehicle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, here is provided a collision warning control apparatus that includes a memory configured to store instructions and processors configured to execute the instructions to obtain position and speed information of a reference point for a target vehicle at a first time point, determine a position of the reference point at a second time point for the target vehicle based on the position and speed information of the reference point for the target vehicle at the first time point, calculate a first overall length of the target vehicle based on the position of the reference point at the second time point and a position of a tracking point for the target vehicle detected at the second time point, determine a position of the reference point at a third time point for the target vehicle based on the position and speed information of the reference point for the target vehicle at the first time point, calculate a second overall length of the target vehicle based on the position of the reference point at the third time point and a position of the tracking point for the target vehicle detected at the third time point, compare the first overall length with the second overall length, and determine a reference overall length of the target vehicle depending on a comparison result, and determine a reference position of the target vehicle at the third time point based on a difference between the first overall length and the second overall length, and control collision warning for the target vehicle based on the reference position of the target vehicle.

When the second overall length has a value smaller than the first overall length, the processors may determine the reference position of the target vehicle at the third time point based on the reference overall length and the position of the reference point for the target vehicle at the third time point.

When the second overall length has a value larger than the first overall length, the processors may determine the position of the reference position at the third time point for the target vehicle as the reference position of the target vehicle.

The processors may generate variation trend data related to a change in the overall length of the target vehicle based on a difference between the first overall length and the second overall length, and determine a position of the target vehicle at the third time point based on the variation trend data.

When the variation trend data exceeds a preset threshold, the processors may determine the reference position of the target vehicle at the third time point based on the reference overall length and the position of the reference point for the target vehicle at the third time point.

When the variation trend data is less than or equal to a preset threshold, the processors may determine the position of the reference point at the third time point for the target vehicle as the reference position of the target vehicle.

The tracking point may be a detection point located closest to a position of a vehicle including the collision warning control apparatus among one or more detection points for the target vehicle detected by the vehicle including the collision warning control apparatus.

The processors may determine, as the reference overall length, the larger of the first overall length and the second overall length.

The processors may determine any one warning zone to which the reference position of the target vehicle belongs from among a plurality of preset warning zones, and control the collision warning to be maintained for the collision warning holding time corresponding to the one warning zone among a plurality of collision warning holding times set differently for each respective preset warning zones.

The processors may determine the collision warning holding time corresponding to the one warning zone according to a time value calculated based on the speed information of the target vehicle at the third time point, and the speed information of the target vehicle is obtained based on the position of the tracking point for the target vehicle at the third time point.

In another general aspect, here is provided a collision warning control method which is performed in a vehicle including a vehicle rear collision warning control apparatus. The method includes obtaining position and speed information of a reference point for a target vehicle at a first time point, determining a position of the reference point at a second time point for the target vehicle based on the position and speed information of the reference point for the target vehicle at the first time point, calculating a first overall length of the target vehicle based on the position of the reference point at the second time point and a position of a tracking point for the target vehicle detected at the second time point, determining a position of the reference point at a third time point for the target vehicle based on the position and speed information of the reference point for the target vehicle at the first time point, calculating a second overall length of the target vehicle based on the position of the reference point at the third time point and a position of the tracking point for the target vehicle detected at the third time point, comparing the first overall length and the second overall length and determining a reference overall length of the target vehicle depending on a comparison result, and determining a reference position of the target vehicle at the third time point based on a difference between the first overall length and the second overall length, and controlling collision warning for the target vehicle based on the reference position of the target vehicle.

Determining the reference position of the target vehicle at the third time point based on the difference between the first overall length and the second overall length may further include, when the second overall length has a smaller value than the first overall length, determining the reference position of the target vehicle at the third time point based on the reference overall length and the position of the reference point for the target vehicle at the third time point.

Determining the reference position of the target vehicle at the third time point based on the difference between the first overall length and the second overall length may further include, when the second overall length has a larger value than the first overall length, determining the position of the reference point for the target vehicle at the third time point as the reference position of the target vehicle.

Determining the reference position of the target vehicle at the third time point based on the difference between the first overall length and the second overall length may further include generating variation trend data related to a change in the overall length of the target vehicle based on the difference between the first overall length and the second overall length, and determining a position of the target vehicle at the third time point based on the variation trend data.

When the variation trend data exceeds a preset threshold, determining the position of the target vehicle at the third time point based on the variation trend data may include determining the reference position of the target vehicle at the third time point based on the reference overall length and the position of the reference point for the target vehicle at the third time point.

When the variation trend data is less than or equal to the preset threshold, determining the position of the target vehicle at the third time point based on the variation trend data may further include determining the position of the reference point for the target vehicle at the third time point as the reference position of the target vehicle.

the tracking point is a detection point located closest to a position of a vehicle including the collision warning control apparatus among one or more detection points for the target vehicle detected by the vehicle including the collision warning control apparatus.

Comparing the first overall length and the second overall length and determining a reference overall length of the target vehicle depending on a comparison result may include determining, as the reference overall length, the larger of the first overall length and the second overall length.

Controlling of collision warning for the target vehicle based on the preset collision warning holding time corresponding to the reference position of the target vehicle may further include determining any one warning zone to which the reference position of the target vehicle belongs from among a plurality of preset warning zones, and controlling the collision warning to be maintained for the collision warning holding time corresponding to the one warning zone among a plurality of collision warning holding times set differently for each respective preset warning zones.

The method may further include determining the collision warning holding time corresponding to the one warning zone according to a time value calculated based on the speed information of the target vehicle at the third time point, and the speed information of the target vehicle is obtained based on the position of the tracking point for the target vehicle at the third time point.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element. \

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Figure 1:
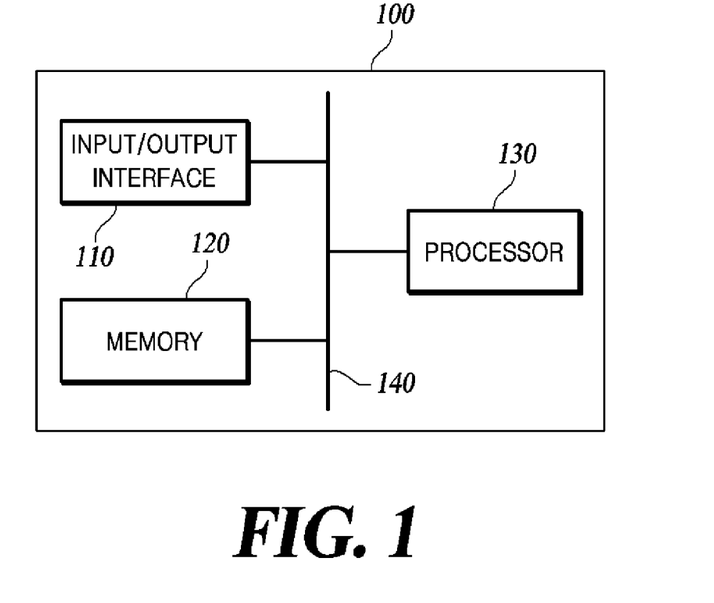
FIG. 1 is a block diagram showing a collision warning control apparatus according to one embodiment of the present disclosure.

FIG. 1 is a block diagram showing a collision warning control apparatus according to one embodiment of the present disclosure.

Referring to FIG. 1, the collision warning control apparatus 100 may include an input/output interface 110, a memory 120, and a processor 130. The input/output interface 110, the memory 120, and the processor 130 included in the collision warning control apparatus 100 can mutually transmit data through a bus 140. The bus 140 may include a wireless or wired communication infrastructure that enables interaction between various components of the collision warning control apparatus 100.

The input/output interface 110 may receive detection information on a target vehicle detected by at least one radar sensor connected to the collision warning control apparatus 100 and transmit it to the processor 130. Here, the detection information on the target vehicle may include position information and speed information regarding a plurality of detection points detected by the radar about the target vehicle having a certain area existing in a preset warning area behind a subject vehicle including the collision warning control apparatus 100.

The input/output interface 110 may transmit a collision warning control signal to an output device connected to the collision warning control apparatus 100. Here, the output device may be an audio device that outputs a sound for warning of a collision based on the collision warning control signal, but is not limited thereto. For example, the output device may be one or more warning lights or a display device for outputting a collision warning based on the collision warning control signal. The one or more warning lights may be any one of incandescent bulbs, LED bulbs, and LED lighting modules. The display device may be at least one of a liquid crystal display (LCD), a thin film transistor-liquid crystal display (TFT LCD), and an organic light-emitting diode (OLED).

The memory 120 may include a volatile memory, permanent memory, virtual memory, or other type of memory for storing information used by or output by the collision warning control apparatus 100. For example, the memory 120 may include a random access memory (RAM) or a dynamic RAM (DRAM).

The memory 120 may store a program for processing or control of the processor 130 and various data for the operation of the collision warning control apparatus 100. For example, the memory 120 may store at least one of detection information on the target vehicle provided to the processor 130, position information of a reference point and an overall length of the target vehicle calculated by the processor 130, and a reference overall length of the target vehicle determined by the processor 130. In addition, the memory 120 may store setting information such as information on a plurality of preset warning zones and information on a collision warning holding time corresponding to each of the plurality of preset warning zones.

The processor 130 determines a tracking point at a first time point based on the detection information on the target vehicle at the first time point transmitted from the input/output interface 110. The processor 130 determines, as the tracking point, a detection point located closest to the position of the subject vehicle including the collision warning control apparatus 100 from among one or more detection points included in the detection information on the target vehicle.

The first time point may be a time point at which a distance between a transverse position of the target vehicle and a transverse position of the subject vehicle including the rear collision warning control apparatus 100 is a certain value or more, and the detection point located closest to the position of the subject vehicle including the rear collision warning control apparatus 100 may correspond to the front surface portion of the target vehicle.

The processor 130 may set the tracking point at the first time point as a reference point at the first time point. Here, the reference point may be any one point corresponding to the front surface portion of the target vehicle. The transverse position of the tracking point at the first time point may be the same as the transverse position of the reference point at the first time point. The processor 130 acquires position and speed information of the reference point for the target vehicle at the first time point based on position and speed information of the tracking point at the first time point.

The processor 130 determines the position of the reference point for the target vehicle at a second time point based on the position and speed information of the reference point for the target vehicle at the first time point. Here, the second time point may be a time continuous from the first time point, but is not limited thereto, and may be a time point after a preset time period from the first time point. For example, the second time point may be a time point after at least one radar cycle of the vehicle radar sensor from the first time point. Here, one radar cycle may generally have a value of 40 ms to 100 ms, but is a variable value depending on the performance specification of the radar sensor.

According to another embodiment, the second time point may be a time point at which the target vehicle enters within a preset tracking point transition section. Here, the preset tracking point transition section may be a section in which the point on the target vehicle closest to the radar sensor of the subject vehicle is a position other than the front and rear surface portions of the target vehicle, for example, an arbitrary point corresponding to the side surface portion of the target vehicle. The tracking point at the second time point for the target vehicle that has entered the preset tracking point transition section has a position corresponding to any one point corresponding to the side surface portion.

The processor 130 calculates a movement distance of the reference point between the first time point and the second time point based on the speed information of the reference point at the first time point and the time difference between the first time point and the second time point. The processor 130 may determine the position of the reference point at the second time point based on the calculated movement distance of the reference point and the position information of the reference point at the first time point. Here, the position of the reference point at the second time point is an estimated position of the front surface portion of the target vehicle at the second time point.

The processor 130 calculates a first overall length of the target vehicle based on the position of the reference point at the second time point and the position of the tracking point for the target vehicle detected by the radar sensor at the second time point.

The tracking point for the target vehicle at the second time point appears as any one point corresponding to the side surface portion of the target vehicle. Since the tracking point for the target vehicle determined as the detection point located closest to the position of the radar sensor mounted on the subject vehicle, the tracking point at the second time point needs to be determined as the same point as the transverse position of the radar sensor or as any one point in the vicinity thereof among points on the side surface portion of the target vehicle.

However, in the case where each point on the side surface portion of the target vehicle has a different radar cross section (RCS) or the shape of the target vehicle includes a discontinuous shape such as a trailer, a tracking error in which the radar sensor may not detect the point which is the same as the transverse position of the radar sensor, which is the closest point, among the points on the side surface portion of the target vehicle, and may determine an arbitrary point far from the closest point or a point near the tracking point at the first time point as the tracking point at the second time point may occur.

The processor 130 may calculate the first overall length, which is a distance between the position of the reference point at the second time point and the position of the tracking point at the second time point.

The processor 130 determines the position of the reference point at a third time point for the target vehicle at the third time point based on the position and speed information of the reference point at the first time point. Here, the third time point may be a time continuous from the second time point, but is not limited thereto, and may be a time point after a preset time period from the first time point. For example, the third time point may be a time point after a plurality of radar cycles of the vehicle radar sensor from the first time point.

The processor 130 calculates a movement distance of the reference point between the first time point and the third time point based on the speed information of the reference point at the first time point and the time difference between the first time point and the third time point. The processor 130 may determine the position of the reference point at the third time point based on the calculated movement distance of the reference point and the position information of the reference point at the second time point. Here, the position of the reference point at the third time point is an estimated position of the front surface portion of the target vehicle at the third time point.

The processor 130 calculates a second overall length of the target vehicle based on the position of the reference point at the third time point and the position of the tracking point for the target vehicle detected by the radar sensor at the third time point. The processor 130 may calculate the second overall length that is a distance between the position of the reference point at the third time point and the position of the tracking point at the third time point.

The processor 130 compares the first overall length of the target vehicle at the second time point with the second overall length of the target vehicle at the third time point to determine a reference overall length of the target vehicle according to the comparison result. The processor 130 may determine the larger of the first overall length and the second overall length as the reference overall length of the target vehicle and store the determined reference overall length in the memory 120.

The target vehicle continues to move from the second time point to the third time point. Accordingly, the position of the reference point at the third time point gradually moves away from the transverse position of the sensor. Since the first overall length is a distance between the tracking point and the reference point at the second time point, and the second overall length is a distance between the tracking point and the reference point at the third time point, if it is assumed that the radar sensor detects the same point as the transverse position of the radar sensor, which is the closest point on the side surface portion of the target vehicle, or any point around it as the tracking point at every time point, the second overall length at the third time point always appears as a larger value than the first overall length at the second time point. That is, unless a tracking error of the radar sensor occurs, the overall length value at each time point shows an increasing trend over time.

However, in the case that the second overall length at the third time point has a smaller value than the first overall length at the second time point, the tracking point at the third time point is determined as an arbitrary point close to the front surface portion of the target vehicle, which means that a tracking error of the radar sensor has occurred.

For example, in the case that the front surface portion of the target vehicle is out of the preset warning area but the remaining part of the target vehicle is still located within the preset warning zone, since there is still a risk of collision, the rear collision warning control apparatus 100 needs to maintain the collision warning by detecting the tracking point for the target vehicle within the preset warning area. However, when a tracking error of the radar sensor occurs and an arbitrary point near the front surface portion of the target vehicle located outside the preset warning zone is detected as the tracking point, the rear collision warning control apparatus 100 may determine that the target vehicle is out of the preset warning area and cancel the collision warning early, and then the risk of collision with the target vehicle increases rapidly.

Accordingly, the processor 130 determines the position of the target vehicle at the third time point based on the difference between the first overall length and the second overall length.

Specifically, when the second overall length has a smaller value than the first overall length, the processor 130 determines that a tracking error for the tracking point has occurred and determines the position of the target vehicle at the third time based on a reference overall length stored in the memory 120. Here, the position of the target vehicle at the third time point is determined based on a point shifted by the reference overall length from the reference point of the target vehicle at the third time point toward the rear surface portion of the target vehicle.

On the other hand, when the second overall length has a larger value than the first overall length, the processor 130 determines that a tracking error for the tracking point has not occurred, and the position of the target vehicle at the third time point is determined based on the tracking point at the third time point.

According to another embodiment, the processor 130 generates variation trend data related to changes in the overall length based on the difference between the first overall length and the second overall length. Here, the variation trend data includes information on the variation trend of the overall length indicating how continuously the overall length has increased or decreased. The collision warning control apparatus 100 may detect how much tracking error of the radar sensor has accumulated based on the variation trend data.

The collision warning control apparatus 100 determines the position of the target vehicle at the third point based on the reference overall length and the variation trend data, and controls the collision warning in the subject vehicle for the target vehicle based on the determined position.

Specifically, when the variation trend data exceeds a preset threshold, the processor 130 determines that there is an error in the information of the tracking point by the radar sensor and determines the position of the target vehicle at the third point based on the reference overall length stored in memory 120. In this case, the position of the target vehicle at the third time point is determined based on a point shifted by the reference overall length from the reference point of the target vehicle at the third time point toward the rear surface portion of the target vehicle.

On the other hand, when the variation trend data is equal to or less than the preset threshold, the processor 130 determines that there is no error in the position of the tracking point at the third time point and determines the position of the target vehicle at the third time point based on the position of the tracking point.

According to another embodiment, the processor 130 may change the point shifted by the reference overall length from the reference point of the target vehicle at the third time point toward the rear surface portion of the target vehicle to a corrected position of the tracking point at the third time point.

The processor 130 controls the collision warning for the target vehicle based on a preset collision warning holding time corresponding to the reference position of the target vehicle.

The processor 130 determines among a plurality of preset warning zones any one warning zone to which the reference position of the target vehicle belongs. In this case, the plurality of preset warning zones are warning zones set by dividing the preset warning area into a plurality of transverse sections. For example, the plurality of preset warning zones may include a first warning zone, a second warning zone, and a third warning zone sequentially set along the traveling direction of the target vehicle from the position farthest from the subject vehicle in the preset warning area.

The processor 130 may control the collision warning to maintain the collision warning for the collision warning holding time corresponding to any one of the warning zones among a plurality of collision warning holding times set differently for the respective preset warning zones.

For example, when the reference position of the target vehicle belongs to the first warning zone, the processor 130 generates a control signal for maintaining the collision warning for a first collision warning holding time corresponding to the first warning zone. When the reference position of the target vehicle belongs to the second warning zone, the processor 130 generates a control signal for maintaining the collision warning for a second collision warning holding time corresponding to the second warning zone. When the reference position of the target vehicle belongs to the third warning zone, the processor 130 generates a control signal for maintaining the collision warning for a third collision warning holding time corresponding to the third warning zone. In this case, the collision warning holding times corresponding to the respective warning zones may be set differently. The processor 130 transmits the generated control signal to the output device connected to the input/output interface 110.

FIGS. 2A to 2D are diagrams illustrating a process in which the collision warning control apparatus according to one embodiment of the present disclosure determines the reference position of the target vehicle at the third time point based on the difference between the first overall length and the second overall length.

Figure 2A:
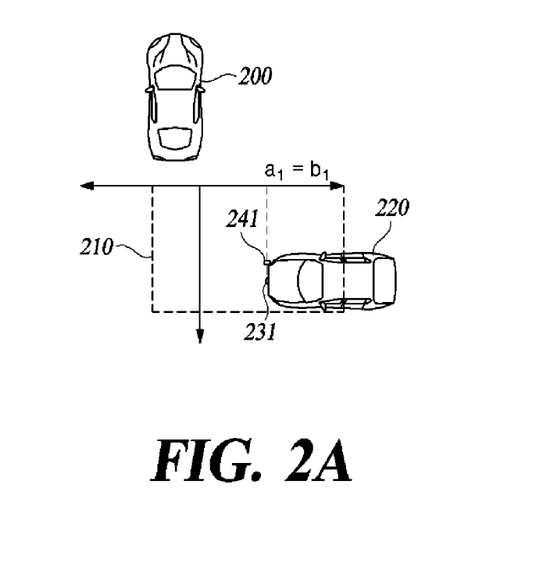
FIGS. 2A to 2D are diagrams illustrating a process in which the collision warning control apparatus according to one embodiment of the present disclosure determines a reference position of a target vehicle at a third time point based on a difference between a first overall length and a second overall length.

FIG. 2A is a diagram illustrating a process in which the collision warning control apparatus tracks the target vehicle at the first time point.

Referring to FIG. 2A, the target vehicle 220 enters a preset warning area 210 behind the subject vehicle 200. The right rear radar sensor mounted on the subject vehicle 200 transmits detection information on the target vehicle 220 at the first time point to the collision warning control apparatus. Here, the detection information may include position and speed information on a plurality of detection points for the target vehicle 220.

Based on the position of the radar sensor, a transverse axis, for example, a distance coordinate axis in a left-right direction of the subject vehicle 200 is set, and the right side is set as positive coordinates and the left side is set as negative coordinates based on the position of the radar sensor in the corresponding coordinate axis. The target vehicle 220 at the first time point is moving in a direction toward the position of the subject vehicle 200 from a transverse position having a positive coordinate value with respect to the transverse axis. Accordingly, most of detection points for the target vehicle 220 are formed around the front surface portion of the target vehicle 220.

The collision warning control apparatus of the subject vehicle 200 determines a detection point located closest to the position of the subject vehicle 200 among the detection points as a tracking point 241 at the first time point. In this case, the transverse position coordinate value of the tracking point 241 at the first time point becomes $b_1$.

Since the tracking point 241 at the first point exists within the preset warning area 210, the collision warning control apparatus may control the collision warning to warn the driver of the collision risk between the subject vehicle 200 and the target vehicle 220. For example, since the target vehicle 220 has already entered the preset warning area 210, a rear collision warning may be maintained in the subject vehicle 200.

The collision warning control apparatus sets a reference point 231 at the first time point. Here, the reference point is determined as a point of the position of the front surface portion of the target vehicle 220. Since the tracking point 241 at the first time point is formed at the position of the front surface portion of the target vehicle 220, the collision warning control apparatus may set the tracking point 241 at the first time point to the reference point 231 at the first time point. In this case, the transverse position coordinate value $b_1$ of the tracking point 241 and a transverse position coordinate value $a_1$ of the reference point 231 may be the same value.

The rear collision warning control apparatus acquires position and speed information on the reference point 231 at the first time point based on position and speed information on the tracking point 241 at the first time point.

Figure 2B:
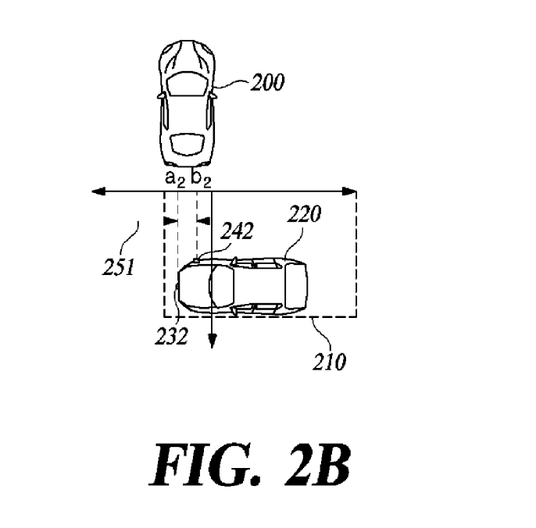

FIG. 2B is a diagram illustrating a process in which the collision warning control apparatus tracks the target vehicle at the second time point.

Referring to FIG. 2B, the target vehicle 220 moves in the direction toward the subject vehicle 200 and crosses the rear side of the subject vehicle 200. In this case, the front surface portion of the target vehicle 220 is located on the left side relative to the position of the radar sensor.

The collision warning control apparatus determines the detection point located closest to the position of the subject vehicle 200 as a tracking point 242 at the second time point among a plurality of detection points included in the detection information at the second time point. In this case, the transverse position coordinate value of the tracking point 242 at the second time point becomes $b_2$.

The collision warning control apparatus determines the position of the reference point 232 at the second time point based on the position information of the reference point 231 at the first time point, the speed information of the reference point 231 at the first time point, and the time difference between the first time point and the second time point. Specifically, the collision warning control apparatus calculates an expected travel distance up to the second time point by multiplying the speed information of the reference point 231 at the first time point by the time difference between the first time point and the second time point, and determines the position of the reference point 232 at the second time point based on the calculated travel distance and the position information of the reference point 231 at the first time point. In this case, the transverse position coordinate value of the reference point 232 at the second time point becomes $a_2$.

The collision warning control apparatus calculates a first overall length 251 for the target vehicle 220 based on the position of the reference point 232 and the position of the tracking point 242 at the second time point. For example, the value of the first overall length 251 may be a value obtained by subtracting $a_2$, which is the transverse position coordinate value of the reference point 232, from $b_2$, which is the transverse position coordinate value of the tracking point 242.

Figure 2C:
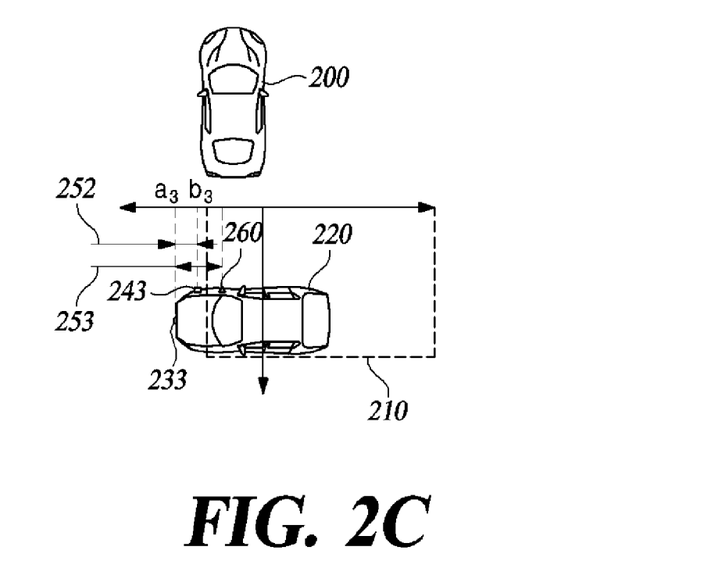

FIG. 2C is a diagram illustrating a process in which the collision warning control apparatus determines a reference position of the target vehicle when the second overall length has a smaller value than the first overall length at the third time point.

Referring to FIG. 2C, the collision warning control apparatus determines the detection point located closest to the position of the subject vehicle 200 as a tracking point 243 at the third time point among a plurality of detection points included in the detection information at the third time point. In this case, the transverse position coordinate value of the tracking point 243 at the third time point becomes $b_3$.

The collision warning control apparatus determines the position of a reference point 233 at the third time point based on the position information of the reference point 231 at the first time point, the speed information of the reference point 231 at the first time point, and the time difference between the first time point and the third time point. Specifically, the collision warning control apparatus calculates an expected travel distance up to the third time point by multiplying the speed information of the reference point 231 at the first time point by the time difference between the first time point and the third time point, and determines the position of the reference point 233 at the third time point based on the calculated travel distance and the position information of the reference point 231 at the first time point. The transverse position coordinate value of the reference point 233 at the third time point becomes $a_3$.

According to another embodiment, the collision warning control apparatus may determine the position of the reference point 233 at the third time point based on the position information of the reference point 232 at the second time point, the speed information of the reference point 232 at the second time point, and the time difference between the second time point and the third time point.

The collision warning control apparatus calculates a second overall length 252 for the target vehicle 220 based on the position of the reference point 233 and the position of the tracking point 243 at the third time point. For example, the value of the second overall length 252 may be a value obtained by subtracting $a_3$, which is the transverse position coordinate value of the reference point 233, from $b_3$ which is the transverse position coordinate value of the tracking point 243.

Referring to FIGS. 2B and 2C, the first overall length 251 has a larger value than the second overall length 252. The collision warning control apparatus determines the first overall length having a larger value between the first overall length 251 and the second overall length 252 as the reference overall length for the target vehicle 220.

Referring back to FIG. 2C, the collision warning control apparatus determines the reference position of the target vehicle 220 at the third time point based on the difference between the first overall length 251 and the second overall length 252. Since the second overall length 252 has a smaller value than the first overall length 251, the collision warning control apparatus determines a point 260 shifted from the reference point 233 at the third time point by a reference overall length 253 as the reference position of the target vehicle 220 at the third time point.

Figure 2D:
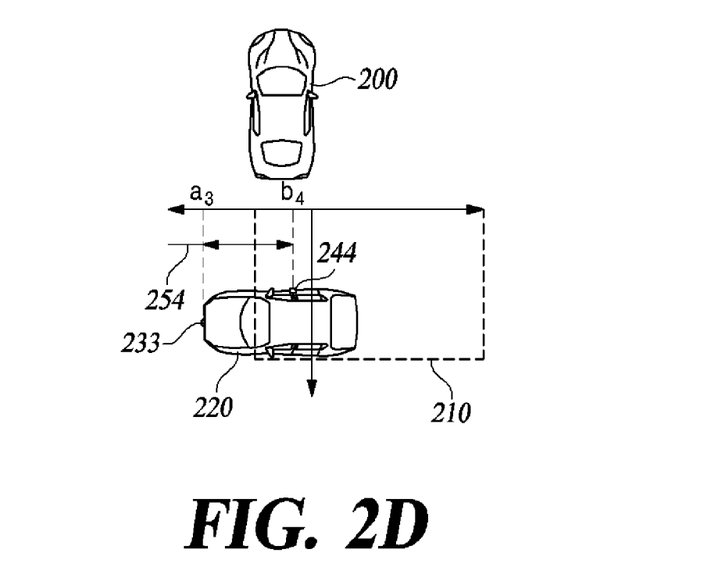

FIG. 2D is a diagram illustrating a process in which the collision warning control apparatus determines a reference position of the target vehicle when the second overall length has a larger value than the first overall length at the third time point.

Referring to FIG. 2D, the collision warning control apparatus determines the detection point located closest to the position of the subject vehicle 200 as a tracking point 244 at the third time point among a plurality of detection points included in the detection information at the third time point. In this case, the transverse position coordinate value of the tracking point 244 at the third time point becomes $b_4$.

The collision warning control apparatus determines the position of the reference point 233 at the third time point based on the position information of the reference point 231 at the first time point, the speed information of the reference point 231 at the first time point, and the time difference between the first time point and the third time point. Specifically, the collision warning control apparatus calculates an expected travel distance up to the third time point by multiplying the speed information of the reference point 231 at the first time point by the time difference between the first time point and the third time point, and determines the position of the reference point 233 at the third time point based on the calculated travel distance and the position information of the reference point 231 at the first time point. The transverse position coordinate value of the reference point 233 at the third time point becomes $a_3$.

According to another embodiment, the collision warning control apparatus may determine the position of the reference point 233 at the third time point based on the position information of the reference point 232 at the second time point, the speed information of the reference point 232 at the second time point, and the time difference between the second time point and the third time point.

The collision warning control apparatus calculates a second overall length 254 for the target vehicle 220 based on the position of the reference point 233 and the position of the tracking point 244 at the third time point. For example, the value of the second overall length 254 may be a value obtained by subtracting $a_3$, which is the transverse position coordinate value of the reference point 233, from $b_4$, which is the transverse position coordinate value of the tracking point 244.

Referring to FIG. 2B and FIG. 2D, the first overall length 251 has a smaller value than the second overall length 254. The collision warning control apparatus determines the second overall length, having a larger value between the first overall length 251 and the second overall length 254, as the reference overall length for the target vehicle 220.

Referring back to FIG. 2D, the collision warning control apparatus determines the reference position of the target vehicle 220 at the third time point based on the difference between the first overall length 251 and the second overall length 254. Since the second overall length 254 has a larger value than the first overall length 251, the collision warning control apparatus determines that it is not a radar sensor detection error situation and determines the tracking point 244 at the third time point as the reference position of the target vehicle 220 at the third time point.

Figure 3:
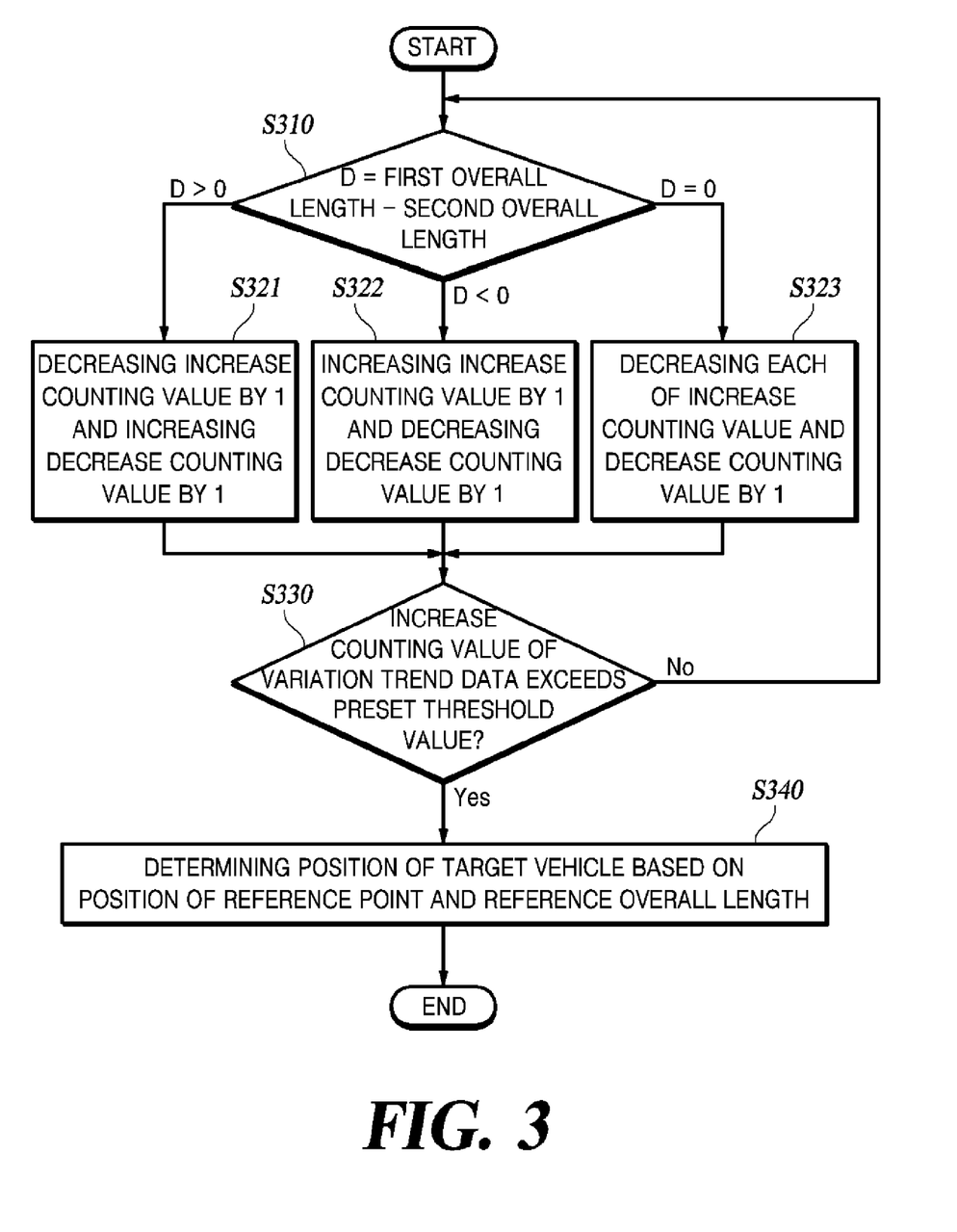
FIG. 3 is a diagram illustrating a process in which a collision warning control apparatus according to another embodiment of the present disclosure generates variation trend data based on the difference between the first overall length and the second overall length, and determines the reference position of the target vehicle at the third time point according to the variation trend data.

FIG. 3 is a diagram illustrating a process in which a collision warning control apparatus according to another embodiment of the present disclosure generates variation trend data based on the difference between the first overall length and the second overall length, and determines the reference position of the target vehicle at the third time point according to the variation trend data.

Referring to FIG. 3, the collision warning control apparatus calculates a value D, which is a difference value between the first overall length and the second overall length, and generates variation trend data based on the value D (S310). In this case, the variation trend data may include an increase counting value and a decrease counting value updated at each time point.

When the value D is greater than 0, that is, when the first overall length is greater than the second overall length, the collision warning control apparatus decreases the increase counting value of the variation trend data by 1 and increases the decrease counting value of the variation trend data by 1 (S321).

When the value D is less than 0, that is, when the first overall length is less than the second overall length, the collision warning control apparatus increases the increase counting value of the variation trend data by 1 and decreases the decrease counting value of the variation trend data by 1 (S322).

When the value D is 0, that is, when the first overall length and the second overall length have the same value, the collision warning control apparatus decreases each of the increase counting value and the decrease counting value of the variation trend data by 1 (S323).

The collision warning control apparatus determines whether the increase counting value of the variation trend data exceeds a preset threshold (S330). In this case, the preset threshold may be set to different values according to tracking performance of the radar sensor. For example, the preset threshold may be set to an integer value of 5 or higher, but is not limited thereto, and the preset threshold may be set to a larger value as the radar sensor has better tracking performance.

When the increase counting value of the variation trend data exceeds the preset threshold, the collision warning control apparatus determines the reference position of the target vehicle based on the position of the reference point and the reference overall length (S340).

The collision warning control apparatus may change a point shifted from the reference point of the target vehicle at the current time point toward the rear surface portion of the target vehicle by the reference overall length as the corrected position of the tracking point at the current time point. The collision warning control apparatus determines the reference position of the target vehicle based on the changed position of the tracking point.

On the other hand, when the increase counting value of the variation trend data is equal to or less than the preset threshold, the collision warning control apparatus determines the reference position of the target vehicle based on the position of the acquired tracking point without changing the position of the tracking point at the current time point.

Figure 4:
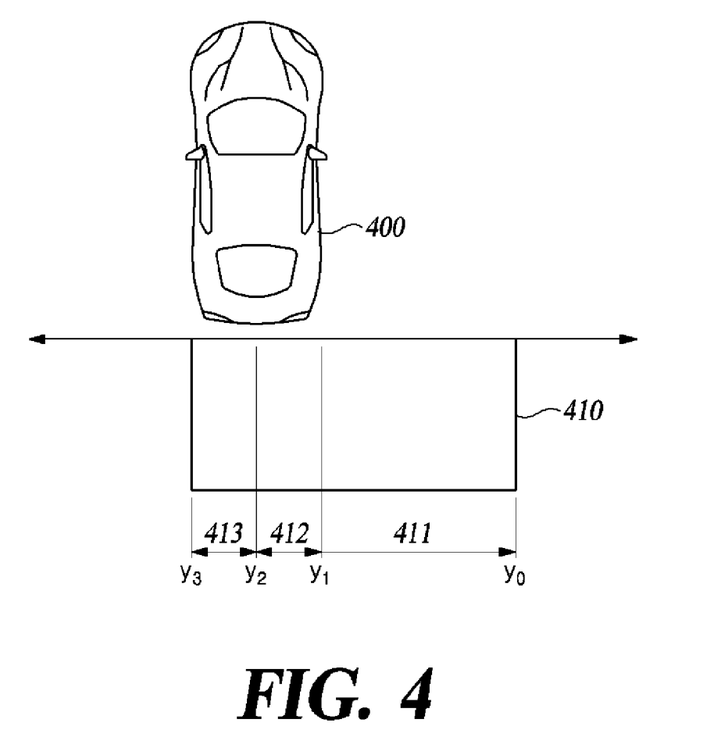
FIG. 4 is a diagram illustrating a process in which the collision warning control apparatus according to one embodiment of the present disclosure controls a collision warning based on a preset collision warning holding time corresponding to the reference position of the target vehicle.

FIG. 4 is a diagram illustrating a process in which the collision warning control apparatus according to one embodiment of the present disclosure controls a collision warning based on a preset collision warning holding time corresponding to the reference position of the target vehicle.

Referring to FIG. 4, the collision warning control apparatus determines one warning zone to which the reference position of the target vehicle belongs among a plurality of warning zones 421, 422, 423 obtained by dividing the preset warning area 420 behind the subject vehicle 400 into transverse sections.

The plurality of preset warning zones may include a first warning zone 411, a second warning zone 412, and a third warning zone 413. In this case, the first warning zone 411 may be set as a section (from $y_0$ to $y_1$) in which the tracking point of the target vehicle is generated at a position corresponding to the front surface portion of the target vehicle. That is, since no position transition of the tracking point occurs, the first warning zone 411 may be set as a zone in which a possibility of a tracking error of the radar sensor is remarkably low.

The second warning zone 412 may be set as a section (from $y_1$ to $y_2$) in which the tracking point of the target vehicle is generated at a position corresponding to the side surface portion of the target vehicle. That is, since the position transition of the tracking point occurs, the second warning zone 412 may be set as an area in which there is a possibility of a tracking error of the radar sensor.

The third warning zone 413 may be set as a section (from $y_2$ to $y_3$) in which the tracking point of the target vehicle is generated at a position corresponding to the rear surface portion of the target vehicle. That is, since the target vehicle is almost out of the warning area, the third warning zone 413 may be set as an area in which the cancelling of the warning is imminent.

The collision warning control apparatus determines to which the determined reference position of the target vehicle belongs to among the first warning zone 411, the second warning zone 412, and the third warning zone 413. The collision warning control apparatus controls the collision warning to be maintained for the collision warning holding time corresponding to the warning zone to which the reference position of the target vehicle belongs among the collision warning holding times set differently for the respective warning zones.

When the reference position of the target vehicle belongs to the first warning zone 411, the collision warning control apparatus controls the collision warning to be maintained for the first collision warning holding time. When the reference position of the target vehicle is in the first warning zone, no information on the overall length of the target vehicle can be obtained, and thus the first collision warning holding time may be set to a time value obtained by dividing an arbitrarily set overall length value by the speed of the target vehicle. In this case, the arbitrarily set overall length value may be set to an average vehicle overall length value, for example, 5 m which is an average overall length value of a sedan-type passenger car, but is not limited thereto.

When the reference position of the target vehicle belongs to the second warning zone 412, the collision warning control apparatus controls the collision warning to be maintained for the second collision warning holding time. In this case, the second collision warning holding time may be set as a time value obtained by dividing the distance of the transverse section from $y_1$ to $y_2$ of the second warning zone 412 by the speed of the target vehicle. When the second collision warning holding time is set too long in the second warning zone 412, a malfunction in which the collision warning is maintained even though the target vehicle is out of the preset warning area 410 may occur. Accordingly, the second collision warning holding time may be set to have a time value smaller than the first collision warning holding time.

When the reference position of the target vehicle belongs to the third warning zone 413, the collision warning control apparatus controls the collision warning to be maintained for the third collision warning holding time. In this case, since the target vehicle is out of the warning area 410 and the cancelling of the collision warning is imminent, the third collision warning holding time may be set to a very small arbitrary value, for example, a value of 100 ms or less.

Figure 5:
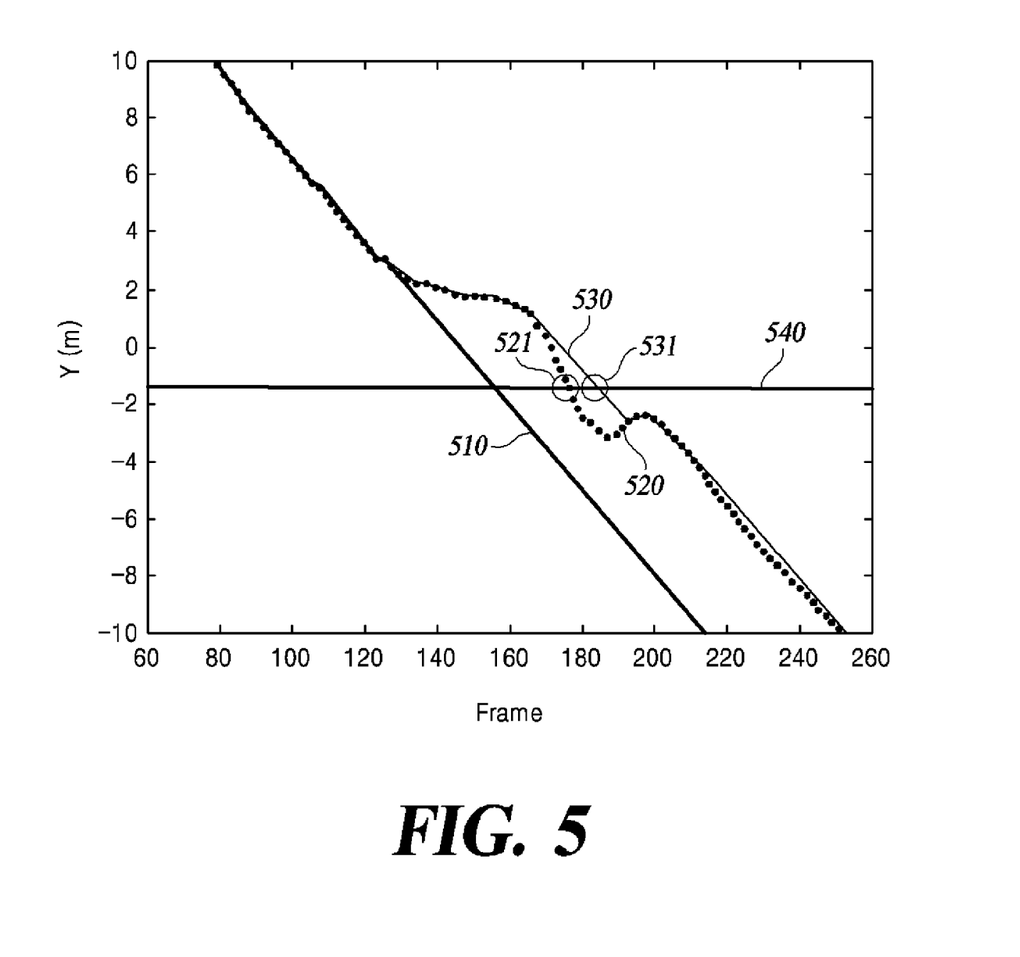
FIG. 5 is a graph showing a collision warning control result of the collision warning control apparatus according to one embodiment of the present disclosure.

FIG. 5 is a graph showing a collision warning control result of the collision warning control apparatus according to one embodiment of the present disclosure.

Referring to FIG. 5, value Y of the vertical axis indicates a transverse distance value between the position of the radar sensor and the position of the target vehicle, with the position of the radar sensor as the origin. The transverse distance value for the target vehicle approaching from the left or right side behind the subject vehicle has a positive value, and the transverse distance value becomes negative as the target vehicle moves away from the position of the radar sensor after passing through the origin position of the radar sensor.

Frame value of the horizontal axis indicates a value related to a time point at which detection information is acquired using the radar sensor. The radar sensor generates detection information at each time point at a preset radar cycle. In this case, detection information at each time point is defined as a frame. For example, the detection information for the N-th frame means detection information of the radar sensor when the time period of N radar cycles has elapsed from the reference time point.

Position coordinates 510 of the reference point for each frame determined based on the front surface portion of the target vehicle constantly decrease over time. This variation trend appears close to the variation trend of the position of the target vehicle.

According to the position of the target vehicle, position coordinates 520 of the tracking point for the target vehicle detected by the radar sensor for each frame appear the same as the position coordinates 510 of the reference point for each frame since the radar sensor detects the front surface portion of the target vehicle initially.

Then, when the radar sensor detects the side surface portion of the target vehicle starting from a time point corresponding to about 130 frames, the transition of the tracking point occurs. Even when the target vehicle moves, the tracking point of the radar sensor is determined as a point corresponding to a position on the side surface portion of the target vehicle closest to the radar sensor. Accordingly, regardless of the position of the reference point of the target vehicle gradually moving away from the position of the radar sensor, the position of the tracking point is determined as a fixed point or a point around it.

However, when a detection error of the radar sensor occurs and the accurate transition of the tracking point fails, the transverse position of the tracking point changes in the moving direction of the target vehicle. The position coordinates 520 of the tracking point for each frame may vary irregularly, and when the accurate transition of the tracking point consecutively fails a certain number of times, a trend in which the transverse position of the tracking point changes rapidly in the moving direction of the target vehicle and the distance between the reference point and the tracking point decreases rapidly may occur.

When a point about 1 meter away from the radar sensor of the subject vehicle is set as a collision warning cancel point 540, the position of the tracking point may reach the warning cancel point 540 early as the position coordinates 520 of the tracking point for each frame decrease rapidly. In this case, even though there is a collision risk, a malfunction in which the collision warning of the collision warning control apparatus is cancelled early 521 may occur.

The collision warning control apparatus according to the present embodiment calculates the overall length for each frame based on the distance between the reference point and the tracking point for each frame in the section where the transition of the tracking point occurs.

The collision warning control apparatus compares a value of the overall length for the previous frame with a value of the overall length for the current frame and determines the larger value as a value of the reference overall length. As a result, the value of the reference overall length determined in the frame for a specific time point becomes the maximum value of all the values of the overall lengths for every frame up to the corresponding time point.

When the rear surface portion of the target vehicle passes through and moves away from the transverse position of the radar sensor, the tracking point for the target vehicle is always determined as the point corresponding to the rear surface portion of the target vehicle. Since the reference point for the target vehicle is determined as a point corresponding to the front surface portion of the target vehicle, the value of the overall length for each frame converges to an actual overall length value of the target vehicle. As a result, the maximum value of the reference overall length is the actual overall length value of the target vehicle.

The collision warning control apparatus determines the reference position of the target vehicle based on the difference in the overall length value for each frame and controls the collision warning of the target vehicle based on the preset collision warning holding time corresponding to the reference position of the target vehicle. In this case, even when the accurate transition of the tracking point fails due to a detection error of the radar sensor, position coordinates 530 for each frame of the tracking point corrected based on the reference overall length show an improved variation trend compared to the position coordinates 520 of the tracking point for each frame before correction. In particular, when the reference position of the target vehicle is determined according to the corrected position coordinates 530 of the tracking point for each frame and the collision warning holding time is set adaptively according to the determined reference position of the target vehicle, compared to a case 521 of the early cancellation of the collision warning due to malfunction, the cancellation of the collision warning 531 occurs at a later time, and robust collision warning control performance against the occurrence of tracking errors of the radar sensor can be secured.

Figure 6:
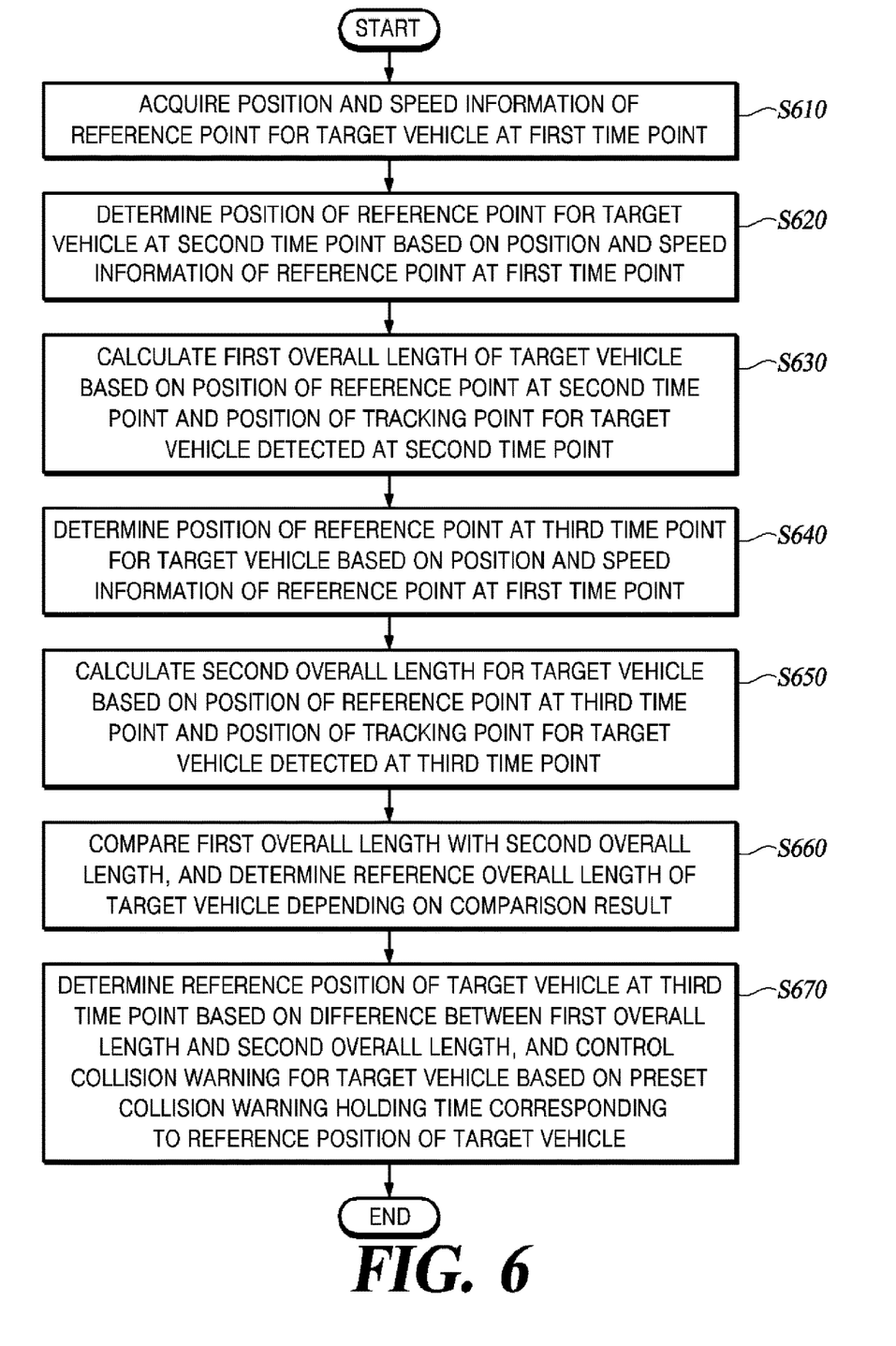
FIG. 6 is a flowchart for explaining a collision warning control method according to one embodiment of the present disclosure.

FIG. 6 is a flowchart for explaining a collision warning control method according to one embodiment of the present disclosure.

Referring to FIG. 6, the collision warning control apparatus acquires position and speed information of a reference point for a target vehicle at a first time point (S610).

The collision warning control apparatus determines a tracking point at the first time point based on detection information on the target vehicle at the first time point. The collision warning control apparatus determines as the tracking point the detection point located closest to the position of the subject vehicle among at least one detection point included in the detection information for the target vehicle.

The first time point corresponds to a position where the transverse position of the target vehicle is greater than or equal to a preset distance from the transverse position of the subject vehicle equipped with the rear collision warning control apparatus, and may be a time point at which a detection point located closest to the position of the subject vehicle appears at any one point corresponding to the front surface portion of the target vehicle.

The collision warning control apparatus may set the tracking point at the first time point as a reference point at the first time point. In this case, the reference point may be any point corresponding to the front surface portion of the target vehicle. The transverse position of the tracking point at the first time point may be the same position as the transverse position of the reference point at the first time point. The collision warning control apparatus acquires the position and speed information of the reference point for the target vehicle at the first time point based on the position and speed information of the tracking point at the first time point.

The collision warning control apparatus determines the position of the reference point for the target vehicle at a second time point based on the position and speed information of the reference point at the first time point (S620).

The second point may be a point where the transverse position of the target vehicle corresponds to a position within a predetermined distance from the transverse position of the subject vehicle equipped with the collision warning control apparatus, and the detection point located closest to the position of the subject vehicle appears at a point corresponding to the side surface portion of the target vehicle, but is not limited thereto. For example, a time point at which the position of the tracking point is included in a preset region where the transition of the tracking point occurs may be set as the second time point. In this case, the preset region in which the transition of the tracking point occurs may be a region in which the tracking point is to be determined as a position corresponding to the side surface portion of the target vehicle or an area experimentally determined according to the performance of the radar sensor.

The collision warning control apparatus calculates the movement distance of the reference point between the first time point and the second time point based on the speed information of the reference point at the first time point and the time difference between the first time point and the second time point, and determines the position of the reference point at the second time point based on the calculated movement distance and the position information of the reference point at the first time point. In this case, the position of the reference point at the second time point is an estimated position of the front surface portion of the target vehicle at the second time point.

The collision warning control apparatus calculates a first overall length for the target vehicle based on the position of the reference point at the second time point and the position of the tracking point for the target vehicle detected at the second time point (S630). In this case, the first overall length has a transverse distance value between the position of the reference point at the second time point and the position of the tracking point at the second time point.

The collision warning control apparatus determines the position of the reference for the target vehicle point at the third time point based on the position and speed information of the reference point at the first time point (S640).

The collision warning control apparatus calculates the movement distance of the reference point between the first time point and the third time point based on the speed information of the reference point at the first time point and the time difference between the first time point and the third time point. The collision warning control apparatus may determine the position of the reference point at the third time point based on the calculated movement distance of the reference point and the position information of the reference point at the second time point. In this case, the position of the reference point at the third time point is an estimated position for the front surface portion of the target vehicle at the third time point.

The collision warning control apparatus calculates a second overall length for the target vehicle based on the position of the reference point at the third time point and the position of the tracking point for the target vehicle detected at the third time point (S650). In this case, the second overall length has a transverse distance value between the position of the reference point at the third time point and the position of the tracking point at the third time point.

The collision warning control apparatus compares the first overall length with the second overall length, and determines the reference overall length of the target vehicle according to the comparison result (S660).

The collision warning control apparatus may determine an overall length having a larger value between the first overall length and the second overall length as the reference overall length for the target vehicle, but is not limited thereto. According to another embodiment, a maximum value among the overall length values for each time point for a preset time period may be determined as the reference overall length.

The collision warning control apparatus determines the reference position of the target vehicle at the third time point based on the difference between the first overall length and the second overall length, and control a collision warning for the target vehicle based on a preset collision warning holding time corresponding to the reference position of the target vehicle (S670).

The collision warning control apparatus determines the position of the target vehicle at the third time point based on the difference between the first overall length and the second overall length.

Specifically, when the second overall length has a smaller value than the first overall length, the collision warning control apparatus determines the position of the target vehicle at the third time point based on the reference overall length. In this case, the position of the target vehicle at the third time point is determined based on a point shifted from the reference point of the target vehicle at the third time point toward the rear surface portion of the target vehicle by the reference overall length. On the other hand, when the second overall length has a larger value than the first overall length, the collision warning control apparatus determines the position of the target vehicle at the third time point based on the tracking point at the third time point.

According to another embodiment, the collision warning control apparatus generates variation trend data related to the change of the overall length based on the difference between the first overall length and the second overall length. In this case, the variation trend data includes information about the variation trend of the overall length on how continuously the overall length increases or decreases. The collision warning control apparatus may detect how much tracking error of the radar sensor has accumulated based on the variation trend data.

The collision warning control apparatus determines the position of the target vehicle at the third time point based on the reference overall length and the variation trend data, and controls the collision warning in the subject vehicle for the target vehicle based on the determined position.

Specifically, when the variation trend data exceeds a preset threshold, the collision warning control apparatus determines the position of the target vehicle at the third time point based on the reference overall length. In this case, the position of the target vehicle at the third time point is determined based on a point shifted from the reference point of the target vehicle at the third time point toward the rear surface portion of the target vehicle by the reference overall length. On the other hand, when the variation trend data is less than or equal to the preset threshold, the collision warning control apparatus determines the position of the target vehicle at the third time point based on the position of the tracking point.

According to another embodiment, the collision warning control apparatus may change the point shifted from the reference point of the target vehicle at the third time point toward the rear surface portion of the target vehicle by the reference overall length as a corrected position of the tracking point at the third time point.

The collision warning control apparatus controls the collision warning for the target vehicle based on the preset collision warning holding time corresponding to the reference position of the target vehicle.

The collision warning control apparatus determines any one warning zone to which the reference position of the target vehicle belongs among a plurality of preset warning zones. In this case, the plurality of preset warning zones are warning zones set by dividing the preset warning area into a plurality of transverse sections.

The collision warning control apparatus may control the collision warning to be maintained for the collision warning holding time corresponding to the one warning zone among a plurality of collision warning holding times set differently for each of the respective preset warning zones. In this case, the collision warning holding times corresponding to each of the warning zones may be set differently. The collision warning control apparatus transmits a control signal including information on the collision warning holding time to a collision warning output device connected to the collision warning control apparatus.

The present disclosure has been made in an effort to solve problems in the related art, and the present disclosure is directed to a method and apparatus for controlling a vehicle rear collision warning capable of determining a reference overall length of a target vehicle based on a first overall length calculated based on a distance between a position of a reference point at a second time point and a position of a tracking point at the second time point for the target vehicle and a second overall length calculated based on a distance between a position of the reference point at a third time point and a position of the tracking point at the third time point for the target vehicle, and determining the reference position of the target vehicle at the third time point based on a difference between the first overall length and the second overall length.

The present disclosure has also been made to implement a vehicle rear collision warning capable of increasing accuracy of position transition of the tracking point, and reduce or eliminate errors in tracking a target vehicle and malfunctioning of a collision warning. The system may reduce or eliminate tracking errors in instances in which the target vehicle has a different radar cross section (RCS) depending on the position of the target vehicle or the target vehicle includes a discontinuous shape such as a trailer connection. The system thereby avoids a tracking error of the radar sensor and creating tracking points of wrong positions. Additionally, the system may eliminate or reduce malfunctions such as early cancellation of the collision warning or irregular suspension of the collision warning.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A collision warning control apparatus comprising:
a memory configured to store one or more instructions; and
one or more processors configured to execute the one or more instructions to:
obtain position and speed information of a reference point for a target vehicle at a first time point;
determine a position of the reference point at a second time point for the target vehicle based on the position and speed information of the reference point for the target vehicle at the first time point;
calculate a first overall length of the target vehicle based on the position of the reference point at the second time point and a position of a tracking point for the target vehicle detected at the second time point;
determine a position of the reference point at a third time point for the target vehicle based on the position and speed information of the reference point for the target vehicle at the first time point;
calculate a second overall length of the target vehicle based on the position of the reference point at the third time point and a position of the tracking point for the target vehicle detected at the third time point;
compare the first overall length with the second overall length, and determine a reference overall length of the target vehicle depending on a comparison result; and
determine a reference position of the target vehicle at the third time point based on a difference between the first overall length and the second overall length, and control collision warning for the target vehicle based on the reference position of the target vehicle.

2. The collision warning control apparatus of claim 1, wherein when the second overall length has a value smaller than the first overall length, the one or more processors are configured to determine the reference position of the target vehicle at the third time point based on the reference overall length and the position of the reference point for the target vehicle at the third time point.

3. The collision warning control apparatus of claim 1, wherein when the second overall length has a value larger than the first overall length, the one or more processors are configured to determine the position of the reference position at the third time point for the target vehicle as the reference position of the target vehicle.

4. The collision warning control apparatus of claim 1, wherein the one or more processors are configured to generate variation trend data related to a change in the overall length of the target vehicle based on a difference between the first overall length and the second overall length, and determine a position of the target vehicle at the third time point based on the variation trend data.

5. The collision warning control apparatus of claim 4, wherein when the variation trend data exceeds a preset threshold, the one or more processors are configured to determine the reference position of the target vehicle at the third time point based on the reference overall length and the position of the reference point for the target vehicle at the third time point.

6. The collision warning control apparatus of claim 4, wherein when the variation trend data is less than or equal to a preset threshold, the one or more processors are configured to determine the position of the reference point at the third time point for the target vehicle as the reference position of the target vehicle.

7. The collision warning control apparatus of claim 1, wherein the tracking point is a detection point located closest to a position of a vehicle including the collision warning control apparatus among one or more detection points for the target vehicle detected by the vehicle including the collision warning control apparatus.

8. The collision warning control apparatus of claim 1, wherein the one or more processors are configured to determine, as the reference overall length, the larger of the first overall length and the second overall length.

9. The collision warning control apparatus of claim 1, wherein the one or more processors are configured to determine any one warning zone to which the reference position of the target vehicle belongs from among a plurality of preset warning zones, and control the collision warning to be maintained for the collision warning holding time corresponding to the one warning zone among a plurality of collision warning holding times set differently for each respective preset warning zones.

10. The collision warning control apparatus of claim 9, wherein the one or more processors are configured to determine the collision warning holding time corresponding to the one warning zone according to a time value calculated based on the speed information of the target vehicle at the third time point, and the speed information of the target vehicle is obtained based on the position of the tracking point for the target vehicle at the third time point.

11. A collision warning control method which is performed in a vehicle including a vehicle rear collision warning control apparatus, the method comprising:

obtaining position and speed information of a reference point for a target vehicle at a first time point;

determining a position of the reference point at a second time point for the target vehicle based on the position and speed information of the reference point for the target vehicle at the first time point;

calculating a first overall length of the target vehicle based on the position of the reference point at the second time point and a position of a tracking point for the target vehicle detected at the second time point;

determining a position of the reference point at a third time point for the target vehicle based on the position and speed information of the reference point for the target vehicle at the first time point;

calculating a second overall length of the target vehicle based on the position of the reference point at the third time point and a position of the tracking point for the target vehicle detected at the third time point;

comparing the first overall length and the second overall length and determining a reference overall length of the target vehicle depending on a comparison result; and determining a reference position of the target vehicle at the third time point based on a difference between the first overall length and the second overall length, and controlling collision warning for the target vehicle based on the reference position of the target vehicle.

12. The collision warning control method of claim 11, wherein determining the reference position of the target vehicle at the third time point based on the difference between the first overall length and the second overall length further comprises:

when the second overall length has a smaller value than the first overall length, determining the reference position of the target vehicle at the third time point based on the reference overall length and the position of the reference point for the target vehicle at the third time point.

13. The collision warning control method of claim 11, wherein determining the reference position of the target vehicle at the third time point based on the difference between the first overall length and the second overall length further comprises:

when the second overall length has a larger value than the first overall length, determining the position of the reference point for the target vehicle at the third time point as the reference position of the target vehicle.

14. The collision warning control method of claim 11, wherein determining the reference position of the target vehicle at the third time point based on the difference between the first overall length and the second overall length further comprises:

generating variation trend data related to a change in the overall length of the target vehicle based on the difference between the first overall length and the second overall length; and determining a position of the target vehicle at the third time point based on the variation trend data.

15. The collision warning control method of claim 14, wherein when the variation trend data exceeds a preset threshold, determining the position of the target vehicle at the third time point based on the variation trend data comprises:

determining the reference position of the target vehicle at the third time point based on the reference overall length and the position of the reference point for the target vehicle at the third time point.

16. The collision warning control method of claim 14, wherein when the variation trend data is less than or equal to the preset threshold, determining the position of the target vehicle at the third time point based on the variation trend data further comprises:

determining the position of the reference point for the target vehicle at the third time point as the reference position of the target vehicle.

17. The collision warning control method of claim 11, wherein the tracking point is a detection point located closest to a position of a vehicle including the collision warning control apparatus among one or more detection points for the target vehicle detected by the vehicle including the collision warning control apparatus.

18. The collision warning control method of claim 11, wherein comparing the first overall length and the second overall length and determining a reference overall length of the target vehicle depending on a comparison result comprises:

determining, as the reference overall length, the larger of the first overall length and the second overall length.

19. The collision warning control method of claim 11, wherein controlling of collision warning for the target vehicle based on the preset collision warning holding time corresponding to the reference position of the target vehicle further comprises:

determining any one warning zone to which the reference position of the target vehicle belongs from among a plurality of preset warning zones; and controlling the collision warning to be maintained for the collision warning holding time corresponding to the one warning zone among a plurality of collision warning holding times set differently for each respective preset warning zones.

20. The collision warning control method of claim 19, further comprising:

determining the collision warning holding time corresponding to the one warning zone according to a time value calculated based on the speed information of the target vehicle at the third time point, and the speed information of the target vehicle is obtained based on the position of the tracking point for the target vehicle at the third time point.

* * * * *